United States Patent [19]
Pinson

[11] Patent Number: 4,725,766
[45] Date of Patent: Feb. 16, 1988

[54] MULTIPLE SPOKE ENERGY STORAGE SYSTEM FOR SPACE ENVIRONMENT

[75] Inventor: George T. Pinson, Huntsville, Ala.

[73] Assignee: The Boeing Company, Seattle, Wash.

[21] Appl. No.: 891,301

[22] Filed: Jul. 31, 1986

[51] Int. Cl.⁴ .......................... H02K 7/02; H02P 9/04
[52] U.S. Cl. ........................................ 322/4; 74/572; 310/74
[58] Field of Search ............... 322/4; 290/54; 74/572; 310/74

[56] References Cited

U.S. PATENT DOCUMENTS

| | | |
|---|---|---|
| 3,248,967 | 5/1966 | Lewis .................................. 74/572 |
| 3,317,765 | 5/1967 | Cone ................................ 322/4 X |
| 3,970,917 | 7/1976 | Diggs .................................. 322/4 |
| 4,446,418 | 5/1984 | Richardson ........................... 322/4 |
| 4,509,006 | 4/1985 | Pinson .................................. 322/4 |
| 4,546,264 | 10/1985 | Pinson .................................. 290/54 |

FOREIGN PATENT DOCUMENTS

| | | | |
|---|---|---|---|
| 0184745 | 9/1985 | Japan ................................... 74/572 |
| 0201138 | 10/1985 | Japan ................................... 74/572 |

Primary Examiner—R. J. Hickey
Attorney, Agent, or Firm—Finnegan, Henderson, Farabow, Garrett & Dunner

[57] ABSTRACT

A multiple spoke energy storage system used in a space environment for storing large amounts of mechanical energy for extended periods of time. The storage system also provides means for generating electrical power that can be used to meet subsystem demands.

5 Claims, 9 Drawing Figures

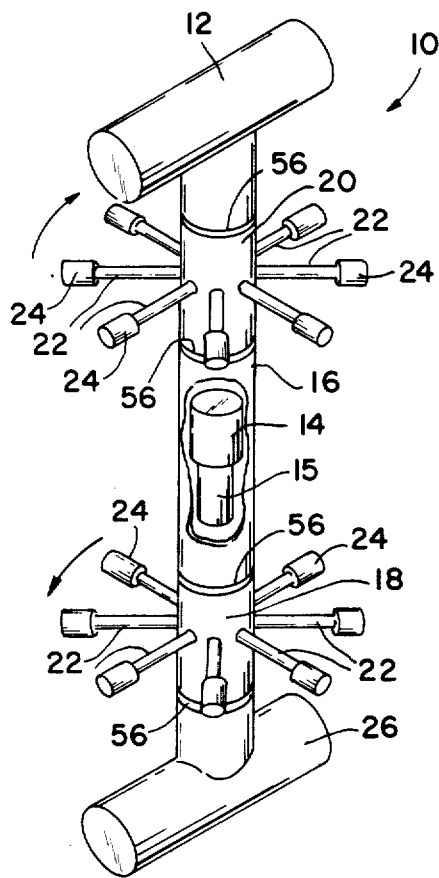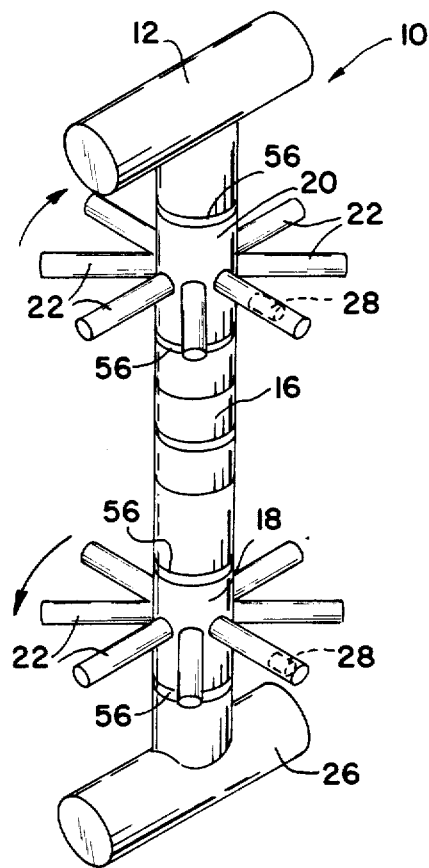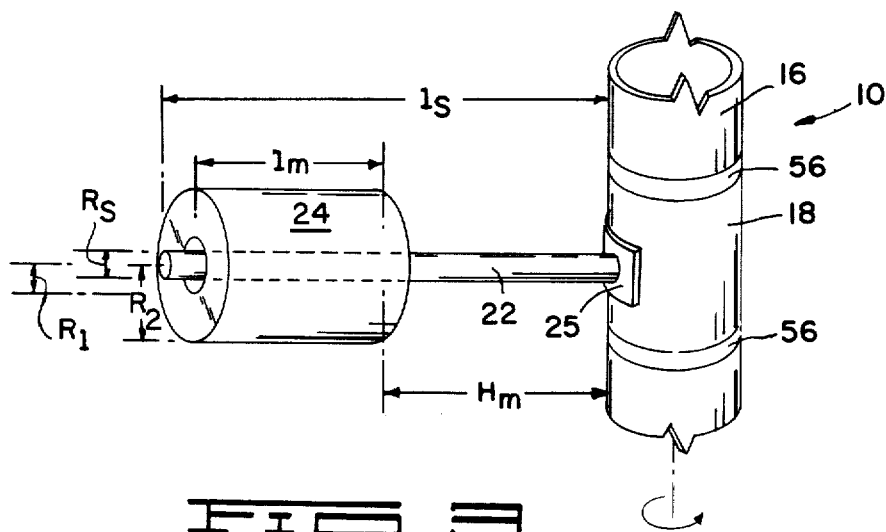

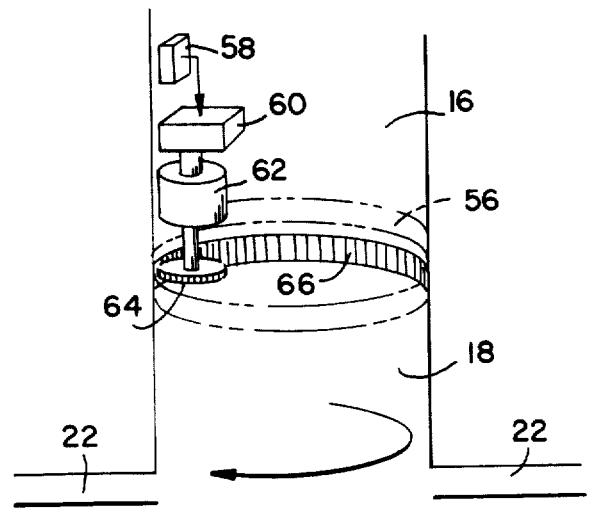
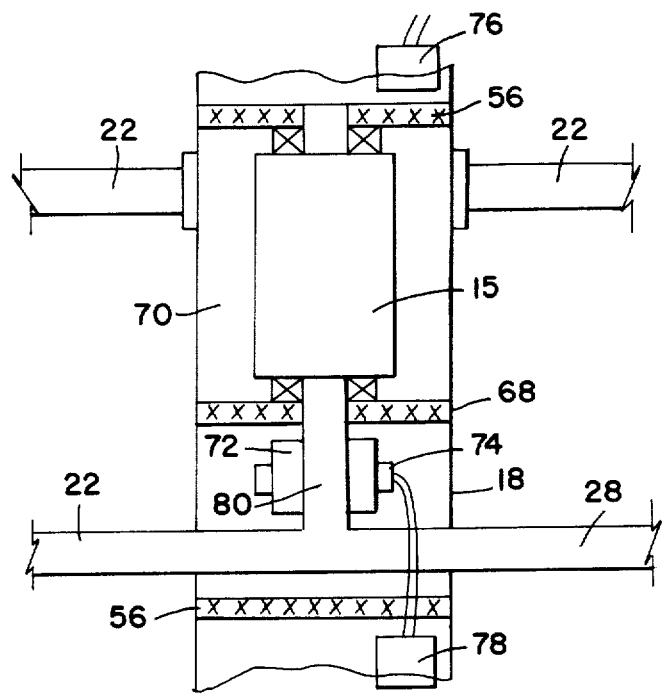
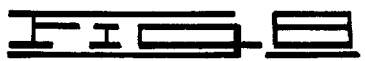

MULTIPLE SPOKE ENERGY STORAGE SYSTEM FOR SPACE ENVIRONMENT

BACKGROUND OF THE INVENTION

This invention relates to an energy storage system for storing mechanical energy and generating electrical energy and more particularly but not by way of limitation to a multiple spoke energy storage system used in a space environment for storing mechanical energy and generating electrical energy.

Heretofore there have been a number of different systems proposed for storing electrical power in a space environment. One type of system has been described in U.S. Pat. No. 4,509,006 to the subject inventor.

Also there are classic methods associated with the storing of energy such as nuclear and electrical power generation together with fuel cells, solar cells, inductors, capacitors and batteries.

Also systems have been used for storing mechanical power for later use which include high speed fly wheels. These types of devices are designed to withstand forces associated with rotation rates of several thousand of revolutions per minute. The forces associated with high speeds are destructive in nature and relatively minor fabrication defects can cause a catastrophic failure. The subject invention provides a system to store large amounts of mechanical energy at a reduced RPM.

SUMMARY OF THE INVENTION

The invention provides a system whereby large amounts of mechanical energy can be stored for extended periods of time in a space environment. Further, the system provides for generating electrical power that can be used for subsystem demands.

Further, the system is readily adaptable for being placed into orbit by current space shuttle aircraft. Also the energy storage system provides for storing mechanical energy at a reduced RPM.

The system includes an elongated cylindrical shaped housing having a first annular shaped hub and a second annular shaped hub rotatably mounted for turning in opposite directions on the housing. A plurality of equally spaced spokes are attached to the hubs and extend outwardly therefrom. Both external and internal masses may be mounted on the spokes and are movable along the length thereof. Different types of drive equipment can be used for moving the movable masses along the length of the spokes. An electrical energy source such as a generator is mounted in the housing for providing an energy source during the initial start up and rotation of the rotating hubs and spokes. Also an electrical controller is contained in the housing for controlling the mechanical energy generated and the electrical power required for the subsystem.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates the multiple spoke energy storage system with movable external masses.

FIG. 2 illustrates the multiple spoke energy storage system with movable masses internally mounted in the spokes.

FIG. 3 illustrates the physical relationship between energy storage elements using externally movable masses.

FIG. 7 illustrates a device for stabilizing the system between rotating and non-rotating elements.

FIG. 8 illustrates the elements of an electrical motor/generator system.

DETAILED DESCRIPTION OF THE DRAWINGS

Figure 4:
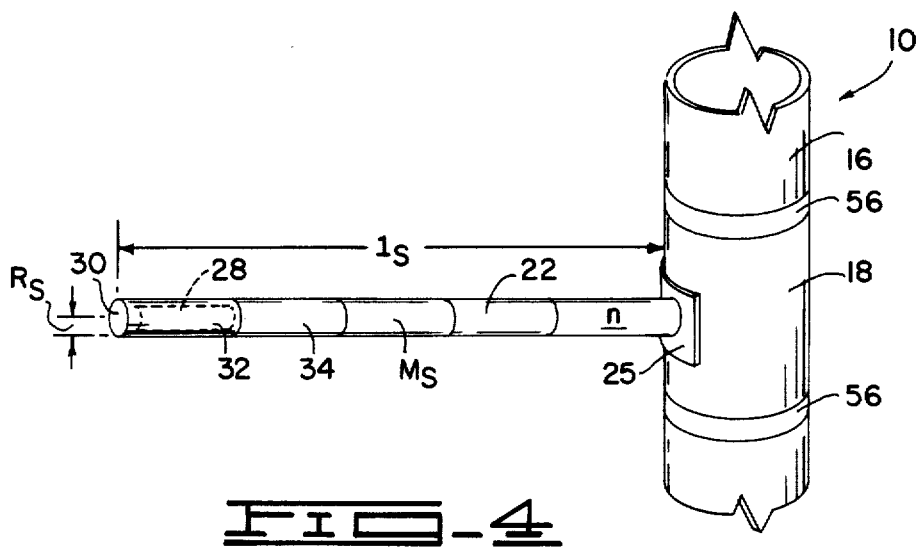
FIG. 4 illustrates the physical relationship between energy storage elements using internally movable masses.

In FIG. 1 the multiple spoke energy storage system for a space environment is designated by general reference numeral 10. The system 10 includes an electrical energy generator 12 which may be used for providing electrical power to an electrical motor/generator 14 stored internally along the length of an elongated cylindrical shaped housing 16. The motor/generator 14 may be of a conventional or hompolar design having an armature 15 connected to a first annular shaped hub 18. The first hub 18 is rotatably mounted on the housing 16 in a direction opposite to a second rotatable annular shaped hub 20. Both of the hubs 18 and 20 include a plurality of equally spaced outwardly extending spokes 22 having in this illustration externally mounted movable masses 24 which can be moved inwardly and outwardly along the length of the spokes 22.

The movable masses 24 are under the control of a power user and controller 26 which moves the masses 24 inwardly and outwardly along the length of the spokes to maintain a constant RPM of the system 10.

It should be noted that each of the spokes 22 are equally spaced and can be arranged so that their position is changed relative to the axis of rotation of the elongated housing 16 for the purpose of maintaining constant RPM as electrical energy is generated and extracted from the system 10. The number of the spokes 22 mounted on the rotating hubs 18 and 20 can be two or more where the rotating system is in a dynamic balance.

In FIG. 2 an alternate design of the system 10 shown in FIG. 1 is illustrated which permits a movable mass to be moved within the spokes 22 to maintain a constant RPM. The mechanical operation and performance of the system 10 is the same as described in FIG. 1. The difference is that the internal movable masses 28 are located inside the spokes 16 instead of external to the spokes 16. Referring now to FIG. 3 an expansion of the spokes and movable masses is described with the moment of inertia of each spoke 16 is given by the following relationship:

$$I_{total} = M_s \left( \frac{R_s^2}{4} + \frac{l_s^2}{3} \right) +$$

$$M_m\left(\frac{R_1^2 + R_2^2}{4} + \frac{l_m^2}{12}\right) + M_m H_m^2$$

where
$I_{total}$ is the total moment of inertia;
$m_s$ is the mass of support of spoke 22;
$R_s$ is the radius of spoke 22;
$l_s$ is the length of spoke 22;
$M_m$ is the mass of movable mass 24;
$R_I$ is the inside radius of movable mass 24;
$R_2$ is the outside radius of movable mass 24;
$l_m$ is the length of movable mass 24; and
$H_m$ is the distance between the centeroid of movable mass 24 and the attachment point 25 of spoke 22 to housing 16.

The rotational kinetic energy of such a device is:

$$KE = \tfrac{1}{2} I_{total} w^2$$

where w is the rotational rate of a single energy storage element about its rotational axis. Since in the FIG. 1 design $l_s$, $M_s$ and $R_s$ are fixed, two parameters $M_m$ changed if w is required to be a constant. The design of FIGS. 1 and 2 varies the distance between the centroid of the mass 24 and an attachment point 25 of the spoke 22 to the housing 16 to enable a variation in I total to be made whereas, the design variation in FIG. 4 varies by the mass by releasing the mass to the surrounding environment or by moving or pumping the internal mass 28 to the central housing 16. FIG. 4 shows another design variation that permits the total inertia to be changed by varying the internal mass in a spoke 22. This is illustrated by the equation:

$$I_{total} = M_s\left(\frac{R_s^2}{4} + \frac{l_s^2}{3}\right)$$

In this relationship since Rs and Is are fixed, the mass can be changed by releasing the mass through a control valve 30 or by moving the mass 28 from chambers 32, 34 and so on through n.

From the preceding discussion it is clear that an obvious design variation exists by providing combinations of the chambers 32, 34, etc. and the movable masses 28 and the support spokes 22 to effect changes in moments of inertia. This, of course, includes the combination of structure as shown in FIGS. 1 and 2.

Figure 5:
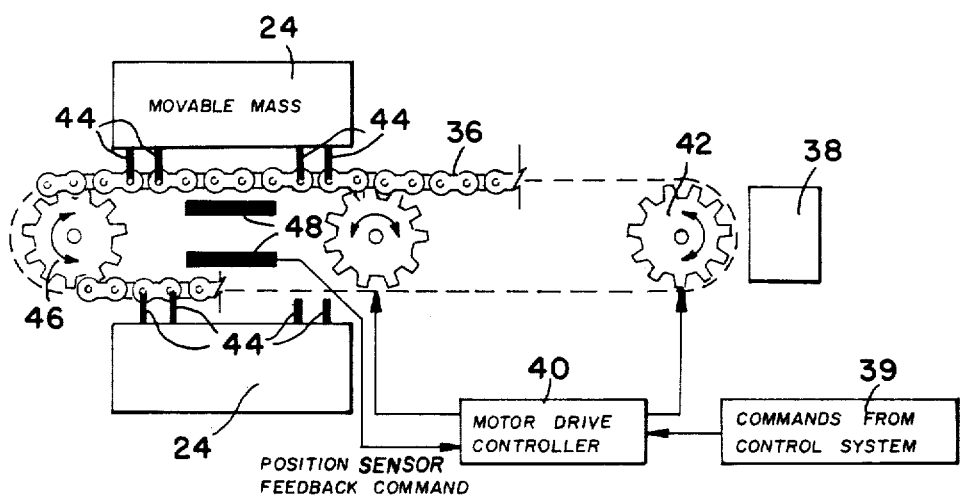
FIG. 5 illustrates a typical drive system for repositioning the movable masses.

Referring back to FIG. 3 the methodology for moving the movable masses along the spokes is of no major importance to the design since the movement of the mass along the length of the spoke 22 can be accomplished by such means as an endless chain 36 driven by a motor 38 as shown in FIG. 5 or anyother similar system. For the purpose of a space application an endless chain with gear driven by the motor 38 has been selected as a baseline. This type of system is lightweight and reliable for either occasionally or continuous use.

In FIG. 5 commands are received from a power storage control system 39 to a motor drive controller 40. The controller 40 using a pulse width modulated signal to drive the motor 38. The motor 38 in turn drives a drive gear 42 mounted on the endless chain 36. The motor and associated gears act upon the chain 36 which is attached to the movable mass 24 using a suitable chain attachment 44. The endless chain 36 continues around gear 46 to provide an endless loop. Position sensors 48 provide feedback to the motor drive controller 40 to complete the control loop In FIG. 6 an alternate method for moving the internal mass 28 in the spokes 22 is described. In this FIG. commands from the control system 39 are sent to a pump drive controller 50. Two way pumps 52 are activated by the controller 50 in accordance with feedback provided by fluid level sensors 52. If the mass is to be moved toward the axis of rotation of the elongated housing 16 the required pump 52 is activated to empty an appropriate chamber 54. This is accomplished by removeing fluid through a fluid orifice 54 from the outside chamber and emptying it into an inside chamber. This process is repeated at a rate and frequency necessary to maintain a constant RPM of the rotating hubs 18 and 20 and spokes 22. In FIG. 1 the electrical energy generator 12 provides the electrical power used by the motors in the system 10 that set the multiple spokes 22 into motion. The electrical energy generator 12 can be of any conventional type and can include nuclear, solar or chemical power generators. The sizing of the electrical energy generator is a function of the rate at which it is desired to store power. The electrical energy generator also provides housekeeping power to the interior of the housing 16. Further, the generator may be replaced with a propulsive device mounted on the spokes 22 or housing 18 to provide initial rotational energy to the system 10.

Bearings 56 are used to separate the housing 16 from the rotating hubs 18 and 20. These bearings 56 may be of any conventional type and may contain reactive elements to stabilize the energy generator 12 and power user and controller 26 sections. This is shown in FIG. 7.

In FIG. 7 a rate sensor 58 provides data concerning the motion of the non-rotating section of the housing 16. The type of sensor selected will depend on the level of precision required for stabilization. A controller 60 interprets the output of the rate sensor 58 and commands a drive motor 62 using a pulse width modulated signal to move in a required direction at a required speed. A gear drive 64 is attached to a ring gear 66 which in turn is attached to the rotating hub 18.

Referring back to FIG. 1 the electrical motor/generator 14 may be of a conventional design with the following modifications of operation. Since a properly designed conventional motor may also perform as a generator depending on whether the armature is driven by an external mechanical force or by an electrical or magnetic field, the control system will provide necessary switching to reconfigure the electrical motor/generator 14 to meet the demands of the power user and controller 26. FIG. 8 shows the design difference between the electrical motor/generator 14 and a conventional motor/generator.

In FIG. 8 the electrical motor/generator 14 is of a conventional design consisting of a bearing 68 separating the armature 15 from communicating coils and housing 70, a commutator 72 and brush 74. Power is provided through slip rings 76 and 78.

In this type design the spokes 22 are attached to the rotating section hub 18 of the housing 16. The armature 15 is connected directly to the hub 18 by an armature shaft 80. As mentioned above the first and second hubs 18 and 20 rotate in opposite directions from each other.

Figure 9:
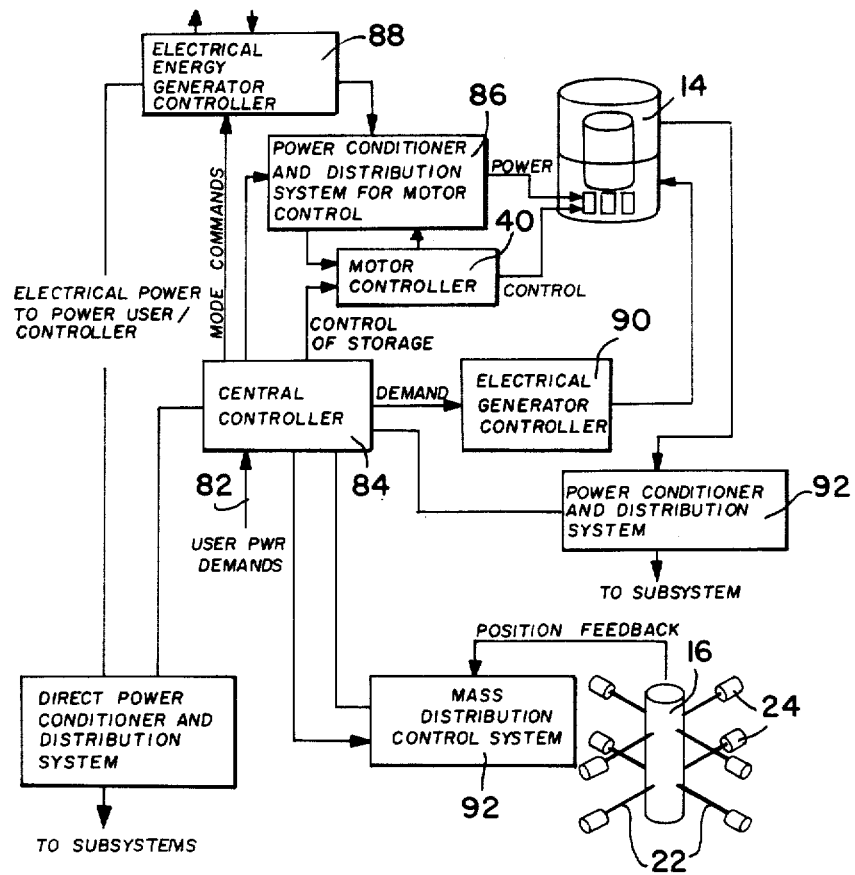
FIG. 9 illustrates an electrical schematic describing the power user/controller subsystem used with the subject invention.

Referring back to FIG. 1 the power and user controller 26 provide control to the entire energy storage and electrical power generator system 10. It also provides power conditioning and power transfer to the user system in a required form. FIG. 9 provides an overview of the function provided by the power user and controller 26.

The user indicated by arrow 82 places power demands upon a central controller 84. The controller 84 operates under several different modes. One is electrical power and is supplied by the electrical energy generator 12 to a direct power conditioning and distribution system 86. Here the power is stepped up or down as desired to the required potential and distributed for use by the systems subsystems. Also the system 10 may operate in an energy storage mode. In this type mode commands are sent to a controller 88, the power conditioner 86 for motor control and the motor controller 40. The electrical motor/generator 14 is conditioned by the motor controller 40 as a motor and the motor counter rotates the first and second hubs 18 and 20. Secondary control is provided by the previously discussed distribution controllers.

A user mode can also be activated. This is accomplished by demands to an electrical generator controller 90 made by the central controller 84. The electrical motor/generator 14 is electrically switched to a generator mode and the rotating hubs and spokes drive the field coils and armature in opposite directions. The generated electrical energy is then routed to a defined subsystem through a power conditioner and distribution system 92.

Figure 6:
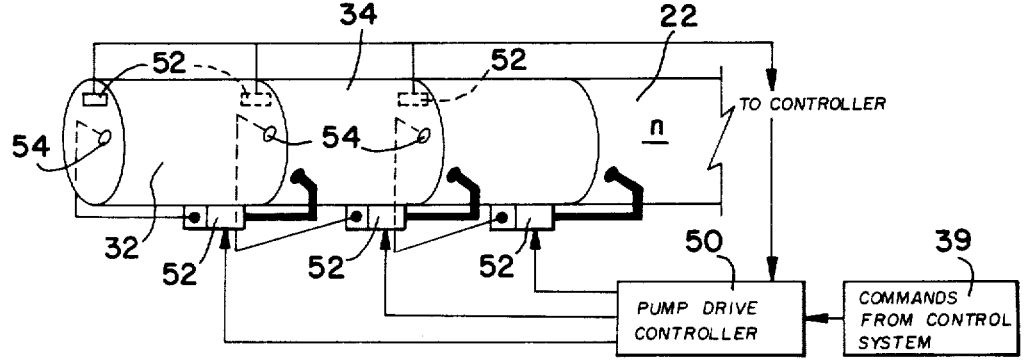
FIG. 6 illustrates a pumping system for repositioning the internal movable masses.

A mass distribution control system 94 interfaces with the motor controller 40 as shown in FIG. 5 and with the pump drive controller 50 shown in FIG. 6 to maintain constant RPM of the system 10.

Changes may be made in the construction and arrangement of the parts or elements of the embodiments as described herein without departing from the spirit or scope of the invention defined in the following claims.

What is claimed is:

1. A multiple spoke energy storage system for a space environment, the system comprising:
    an elongated housing having a first annular hub and a second annular hub rotatably mounted for rotation in opposite directions on the housing;
    a plurality of equally spaced spokes attached to the hubs and extending outwardly therefrom;
    masses mounted on the spokes and movable along the length of the spokes;
    control means connected to the masses for moving the masses along the length of the spokes and maintaining a constant RPM;
    an electrical energy source mounted on the housing for starting the initial rotation of the spokes; and
    electrical generating means mounted in the housing and connected to the hubs for generating electrical energy during the rotation of the spokes.

2. The system as described in claim 1 wherein the movable masses are mounted externally along the length of the spokes and moved along the length thereof by the control means.

3. The system as described in claim 1 wherein the movable masses are mounted internally in the spokes and movable along the length thereof by the control means, the spokes divided into individual compartments for receiving the internal masses and maintaining constant RPM.

4. The system as described in claim 1 wherein the electrical generating means is an electrical motor/generator disposed inside the housing and having an armature with armature shaft connected directly one of the rotating hubs for generating electrical energy.

5. A multiple spoke energy storage system for a space environment, the system comprising:
    an elongated housing having a first annular hub and a second annular rubs being, the hubs rotatably mounted on the housing;
    a plurality of equally spaced spokes attached to the hubs and extending outwardly therefrom;
    movable masses mounted on the spokes;
    control means connected to the movable masses and the spokes for moving the masses along the length of the spokes and maintaining a constant RPM of the spokes and the rotating hubs;
    an electrical energy source attached to the housing for providing initial electrical energy during the start up and rotation of the hubs and spokes; and
    electrical generating means mounted in the housing and connected to the rotating spokes for generating electrical energy during the rotation of the spokes and hubs.

* * * * *

UNITED STATES PATENT AND TRADEMARK OFFICE
CERTIFICATE OF CORRECTION

PATENT NO. : 4,725,766

DATED : FEBRUARY 16, 1988

INVENTOR(S) : GEORGE T. PINSON

It is certified that error appears in the above-identified patent and that said Letters Patent is hereby corrected as shown below:

Column 4, line 13, "removeing" should be --removing--.

Signed and Sealed this

Seventh Day of June, 1988

Attest:

DONALD J. QUIGG

*Attesting Officer*  *Commissioner of Patents and Trademarks*